United States Patent Office.

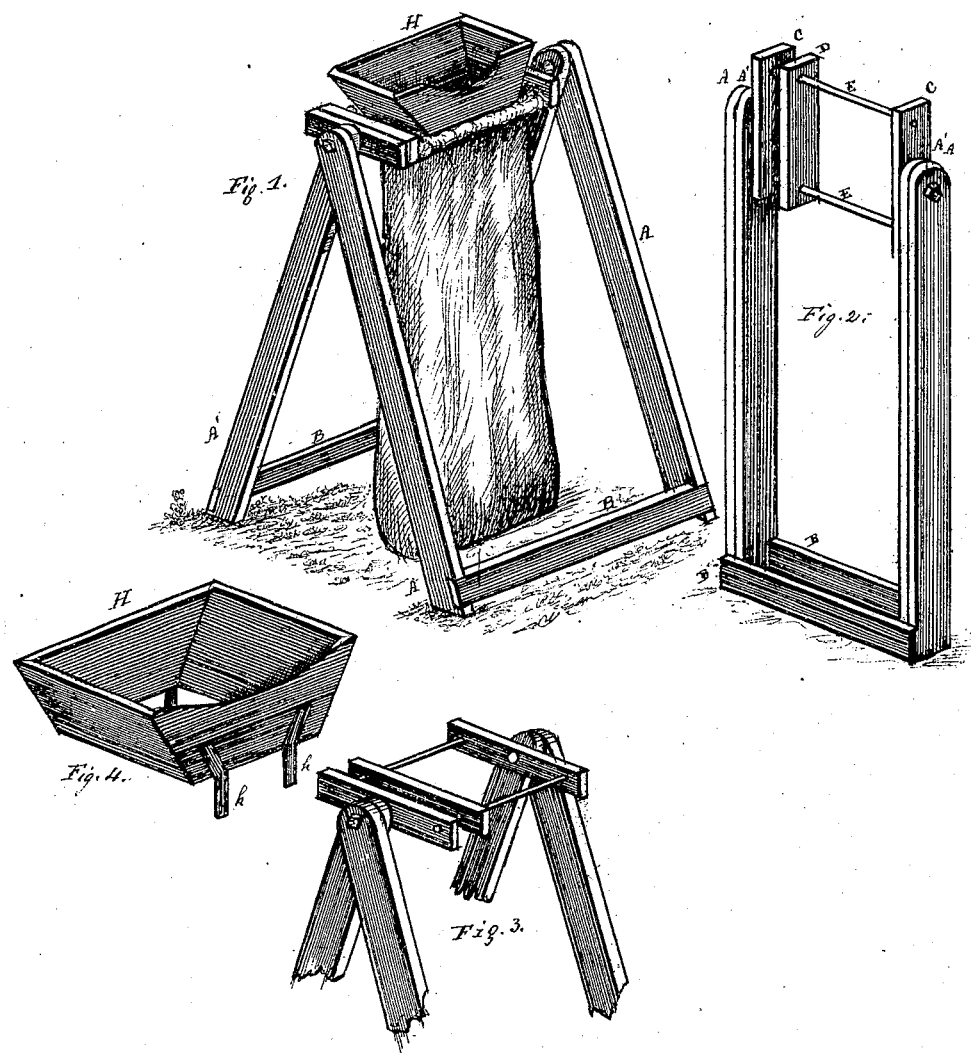

GEORGE D. SWEIGERT, OF MARTIC TOWNSHIP, PENNSYLVANIA, ASSIGNOR TO HIMSELF AND SAMUEL ESHLEMAN, OF SAME PLACE.

Letters Patent No. 102,616, dated May 3, 1870.

IMPROVEMENT IN BAG-HOLDERS.

The Schedule referred to in these Letters Patent and making part of the same.

*To all whom it may concern:*

I, GEORGE D. SWEIGERT, of Martic township, in the county of Lancaster and State of Pennsylvania, have invented certain Improvements in Bag-Holders, of which the following is a specification.

The object of my invention is to combine a simple bag-holder, readily made, adjustable in height, folding together so as to occupy but little space, and adapted to bags of different lengths and breadths.

The accompanying drawings clearly show the construction and manner of using my invention.

Figure 1 shows the bag-holder, with a hopper, and bag to be filled.

Figure 2 shows the holder folded together.

Figure 3 shows the top in position, with the hopper and bag removed.

Figure 4, the hopper.

A brief description is deemed sufficient to enable any one skilled in the art to make and use my invention; this consists of four supporting pieces, A A A' A', hinged at top in pairs, by a headed bolt, with screw and nut, or rivet, united below by a cross-piece, B, in pairs, so that one slides into or between the outer two, as shown.

The holder consists of two head-pieces C C, united together by two rods E E, parallel to each other, leaving an open space to receive the mouth of a bag around said rods in the head-pieces, an adjustable or loose head-block, D, sliding on said rods, to adjust for narrower bags.

A hopper, H, tapering so that it may be adapted to narrower or wider bags, is set into the mouth of the bag, spread open over the rods, and is firmly clamped and held open by the hopper, and greatly facilitates the filling in of bags; and, although simple, has many advantages over many that operate by springs and catches or other contrivances more complicated, and subject to get out of order.

I am aware that numerous devices are used, such as in patent No. 63,383, April 2, 1867. This consists of a cross-frame, like a saw-buck, travels on rollers, which differs substantially from my invention.

I am not aware of a bag-holder with head-pieces united by rods, with or without an intermediate adjustable sliding head-piece, held jointly between the top ends of spreading foot-pieces, joined, as shown, by cross-pieces, and used and adjusted as set forth and shown.

What I claim as my invention, and desire to secure by Letters Patent, is—

The arrangement of the supports A A' with the head-pieces C C, united by the rods E, between the hinged upper ends of the said uprights, with or without the sliding adjusting block D, and the hopper H, all combined, in the manner and for the purpose described.

GEORGE D. SWEIGERT.

Witnesses:
WM. B. WILEY,
JACOB STAUFFER.